United States Patent
Kim

(10) Patent No.: US 11,203,335 B2
(45) Date of Patent: *Dec. 21, 2021

(54) COLLISION AVOIDANCE APPARATUS AND COLLISION AVOIDANCE METHOD

(71) Applicant: Mando Corporation, Pyeongtaek-si (KR)

(72) Inventor: MinGyu Kim, Seoul (KR)

(73) Assignee: Mando Corporation, Pyeongtaek-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/595,747

(22) Filed: Oct. 8, 2019

(65) Prior Publication Data

US 2020/0108825 A1    Apr. 9, 2020

(30) Foreign Application Priority Data

Oct. 8, 2018    (KR) .......................... 10-2018-0120072

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *G06K 9/00825* (2013.01);
(Continued)

(58) Field of Classification Search
CPC ............. B60W 30/09; B60W 30/0956; B60W 2554/803; B60W 2554/801;
(Continued)

(56) References Cited

U.S. PATENT DOCUMENTS

| 10,239,452 B1* | 3/2019 | Szczepaniak ......... B60W 30/08 |
| 2013/0054128 A1* | 2/2013 | Moshchuk ............ B60W 10/18 701/301 |

(Continued)

FOREIGN PATENT DOCUMENTS

| JP | 2005-081937 A | 3/2005 |
| KR | 10-1510006 B1 | 4/2015 |
| KR | 10-2017-0086888 A | 7/2017 |

OTHER PUBLICATIONS

Extended European Search Report dated Jul. 3, 2020 in European Application No. 19202009.7.

*Primary Examiner* — Abby Y Lin
*Assistant Examiner* — Renee LaRose
(74) *Attorney, Agent, or Firm* — Morgan, Lewis & Bockius LLP

(57) ABSTRACT

The present disclosure provides a collision avoidance apparatus including: a first detector configured to detect another vehicle information including a longitudinal velocity and a lateral velocity of another vehicle, and distance information including a longitudinal distance and a lateral distance from another vehicle; a second detector configured to detect subject vehicle information including a velocity and a yaw rate of the subject vehicle; a calculator configured to determine whether steering avoidance is executable, on the basis of the another vehicle information, the subject vehicle information, and the distance information, and when steering avoidance is executable, calculate steering avoidance information on steering avoidance of the subject vehicle; and a control unit configured to control the subject vehicle to travel according to the steering avoidance information. Therefore, it is possible to prevent execution of steering avoidance in a case where steering avoidance is not needed or is inexecutable, and safer steering avoidance can be performed.

13 Claims, 14 Drawing Sheets

(51) Int. Cl.
*G06K 9/00* (2006.01)
*G08G 1/16* (2006.01)

(52) U.S. Cl.
CPC ....... *G08G 1/166* (2013.01); *B60W 2554/801* (2020.02); *B60W 2554/803* (2020.02)

(58) Field of Classification Search
CPC ..... B60W 2720/125; B60W 2554/802; B60W 2710/20; B60W 2420/52; B60W 2420/54; B60W 2520/10; B60W 2520/14; B60W 2554/4042; B60W 2554/4043; B60W 10/20; B60W 30/095; B60W 30/0953; B60W 2520/12; B60W 2554/80; B60W 30/08; B60W 40/02; B60W 40/105; B60W 40/114; G06K 9/00825; G06K 9/00805; G08G 1/166
See application file for complete search history.

(56) References Cited

U.S. PATENT DOCUMENTS

| | | | |
|---|---|---|---|
| 2014/0163825 A1* | 6/2014 | Kim | B60R 21/0134 |
| | | | 701/45 |
| 2015/0298692 A1 | 10/2015 | Minemura et al. | |
| 2017/0358209 A1* | 12/2017 | Ohmori | B60T 7/22 |
| 2018/0154892 A1 | 6/2018 | Tamura et al. | |
| 2018/0281857 A1 | 10/2018 | Choi et al. | |
| 2019/0100197 A1* | 4/2019 | Saiki | B60W 50/14 |
| 2020/0031394 A1* | 1/2020 | Kamatani | B62D 15/025 |

* cited by examiner

COLLISION AVOIDANCE APPARATUS AND COLLISION AVOIDANCE METHOD

CROSS REFERENCE TO RELATED APPLICATION

This application claims priority from Korean Patent Application No. 10-2018-0120072, filed on Oct. 8, 2018, which is hereby incorporated by reference for all purposes as if fully set forth herein.

BACKGROUND OF THE INVENTION

1. Field of the Invention

The present disclosure relates to a collision avoidance apparatus and a collision avoidance method capable of performing avoidance braking for avoiding a collision with another vehicle.

2. Description of the Prior Art

Recently, according to an increase in not only requirements for the performance of a vehicle but also requirements for the convenience and safety of a driver, research on and development of a Driver Assist System (DAS), which assists in controlling a vehicle on the basis of information acquired through a sensor mounted on the vehicle, are being actively conducted.

There is a system for preventing a collision of a vehicle as one of such DASs. A system for preventing a collision between vehicles may detect the position, velocity, and the like of another vehicle adjacent to a subject vehicle by using sensors, including a camera, a radar, and the like, mounted on a vehicle, and when a collision between the vehicles is predicted, may warn a driver of the subject vehicle or enables the driver to avoid a collision with another vehicle through automatic control of the subject vehicle.

The system for preventing a collision between vehicles calculates lateral information and longitudinal information of another vehicle so as to predict a collision time point, but there is a need for a method capable of more safely performing steering avoidance of a vehicle according to a predicted path of another vehicle.

SUMMARY OF THE INVENTION

It is an aspect of the one or more exemplary embodiments to COLLISION AVOIDANCE APPARATUS AND COLLISION AVOIDANCE METHOD.

According to an aspect of an exemplary embodiment, there is provided a vehicle control apparatus comprising: a first detector configured to comprise an image sensor operable to be disposed at a vehicle so as to have a field of view exterior of the vehicle, the image sensor configured to capture image data; and a processor configured to process the image data captured by the image sensor, wherein the first detector configured to detect another vehicle information comprising a longitudinal velocity and a lateral velocity of another vehicle, and distance information comprising a longitudinal distance and a lateral distance from another vehicle; a second detector configured to detect subject vehicle information comprising a velocity and a yaw rate of the subject vehicle; and a controller, responsive at least in part to processing by the processor of the image data, configured to control steering avoidance of the subject vehicle, wherein the controller is configured to comprise: calculator configured to determine whether steering avoidance is executable on the basis of the another vehicle information, the subject vehicle information, and the distance information, and calculate steering avoidance information on steering avoidance of the subject vehicle when the steering avoidance is executable; and a control unit configured to control the subject vehicle to travel according to the steering avoidance information.

Wherein the first detector is configured to further comprise at least one of a radar sensor, a light detection and ranging (LiDAR) sensor, and an ultrasonic sensor.

Wherein the calculator is configured to: calculate a Time To Collision (TTC) on the basis of the another vehicle information, the subject vehicle information, and the distance information; and determine that steering avoidance is executable when a lateral position of the another vehicle and a lateral position of the another vehicle at the TTC lie in an identical direction with reference to a front straight line of the subject vehicle.

Wherein the calculator is configured to calculate: current overlap information on whether there occurs an overlap in which the subject vehicle and the another vehicle overlap each other, and predictive overlap information on whether the overlap occurs at the TTC, on the basis of the another vehicle information, the subject information, and the distance information.

Wherein the calculator is configured to, when an overlap occurs according to the current overlap information and an overlap occurs according to the predictive overlap information, determine that the steering avoidance is executable.

Wherein the calculator is configured to, when the steering avoidance is executable, calculate a desired lateral movement distance on the basis of a larger overlap value among the current overlap information and the predictive overlap information.

Wherein the calculator is configured to calculate a steering avoidance time on the basis of the desired lateral movement distance, an allowable lateral acceleration of the subject vehicle, and a response time for reaching the allowable lateral acceleration.

Wherein the calculator is configured to: calculate a required longitudinal distance on the basis of the subject vehicle information and the steering avoidance time; and determine that the steering avoidance is executable when the required longitudinal distance is shorter than the longitudinal distance.

Wherein the control unit is configured to: when the steering avoidance is executable, control the subject vehicle to perform steering avoidance at the allowable lateral acceleration in an avoidance direction; and control such that the subject vehicle travels at the allowable lateral acceleration in a direction opposite to the avoidance direction from a time point faster by the response time than the steering avoidance time.

According to an aspect of another exemplary embodiment, there is provided a vehicle control apparatus comprising: a first detector configured to comprise a image sensor operable to be disposed at a vehicle so as to have a field of view exterior of the vehicle, the image sensor configured to capture image data; a second detector configured to detect subject vehicle information comprising a velocity and a yaw rate of a subject vehicle; a domain control unit, configured to process the image data captured by the image sensor, acquire another vehicle information comprising longitudinal velocity and a lateral velocity of another vehicle, and distance information comprising longitudinal distance and a lateral distance from the another vehicle, and control at least one driver assistance system disposed in the vehicle; wherein the domain control unit, responsive at least in part to processing by the processor of the image data, is configured to: determine whether steering avoidance is executable, according to the another vehicle information, the subject vehicle information, and the distance information; when the steering avoidance is executable, calculate steering avoidance information on steering avoidance of the subject vehicle; and control the subject vehicle to travel according to the steering avoidance information.

Wherein the domain control unit is configured to: calculate a Time To Collision (TTC) on the basis of the another vehicle information, the subject vehicle information, and the distance information; and determine that steering avoidance is executable when a lateral position of the another vehicle and a lateral position of the another vehicle at the TTC lie in an identical direction with reference to a front straight line of the subject vehicle.

Wherein the domain control unit is configured to calculate: current overlap information on whether there occurs an overlap in which the subject vehicle and the another vehicle overlap each other, and predictive overlap information on whether the overlap occurs at the TTC, on the basis of the another vehicle information, the subject information, and the distance information.

Wherein the domain control unit is configured to, when an overlap occurs according to the current overlap information and an overlap occurs according to the predictive overlap information, determine that the steering avoidance is executable.

Wherein the domain control unit is configured to, when the steering avoidance is executable, calculate a desired lateral movement distance on the basis of a larger overlap value among the current overlap information and the predictive overlap information.

Wherein the domain control unit is configured to calculate a steering avoidance time on the basis of the desired lateral movement distance, an allowable lateral acceleration of the subject vehicle, and a response time for reaching the allowable lateral acceleration.

Wherein the domain control unit is configured to:

calculate a required longitudinal distance on the basis of the subject vehicle information and the steering avoidance time; and determine that the steering avoidance is executable when the required longitudinal distance is shorter than the longitudinal distance.

Wherein the domain control unit is configured to: when the steering avoidance is executable, control the subject vehicle to perform steering avoidance at the allowable lateral acceleration in an avoidance direction; and control such that the subject vehicle travels at the allowable lateral acceleration in a direction opposite to the avoidance direction from a time point faster by the response time than the steering avoidance time.

According to an aspect of another exemplary embodiment, there is provided an image sensor operable to be disposed at a vehicle so as to have a field of view exterior of the vehicle, the image sensor configured to capture image data, the image sensor comprising: the image data is processed by a processor, and after being processed by the processor, is used to acquire another vehicle information comprising a longitudinal velocity and a lateral velocity of another vehicle, and distance information comprising a longitudinal distance and a lateral distance from the another vehicle; and the another vehicle information and the distance information, together with subject vehicle information, are used to determine whether steering avoidance is executable, calculate steering avoidance information on steering avoidance of the subject vehicle when the steering avoidance is executable, and generate a control signal for the subject vehicle so as to travel according to the steering avoidance information.

According to an aspect of another exemplary embodiment, there is provided A vehicle control method comprising: detecting another vehicle information comprising a longitudinal velocity and a lateral velocity of another vehicle, and distance information comprising a longitudinal distance and a lateral distance from the another vehicle; detecting subject vehicle information comprising a velocity and a yaw rate of a subject vehicle; determining whether steering avoidance is executable on the basis of the another vehicle information, the subject information, and the distance information; when the steering avoidance is executable, calculating steering avoidance information on steering avoidance of the subject vehicle; and controlling the subject vehicle vehicle according to the steering avoidance information.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
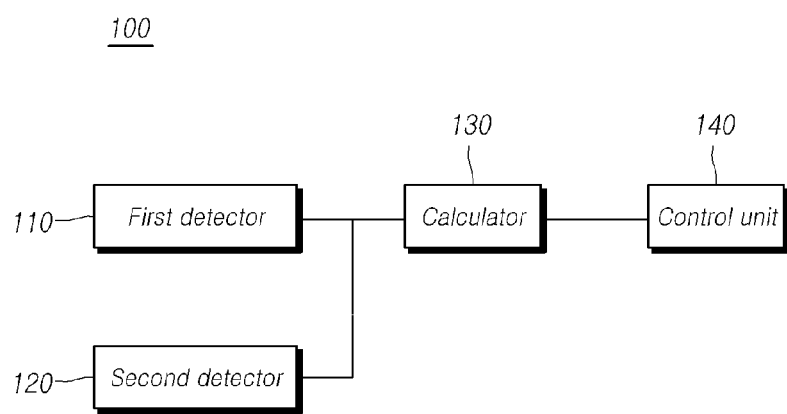
FIG. 1 is a block diagram illustrating a configuration of a collision avoidance apparatus according to the present disclosure.

Hereinafter, embodiments of the present disclosure will be described in detail with reference to the accompanying drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected", "coupled" or "joined" to another component, a third component may be "connected", "coupled", and "joined" between the first and second components, although the first component may be directly "connected", "coupled", or "joined" to the second component.

Unless defined otherwise, all terms as used herein (including technical terms and scientific terms) have the same meaning as commonly understood by a person of ordinary skill in the art to which the present disclosure pertains. Such terms as those defined in a generally used dictionary are not to be interpreted to have ideal or excessively meanings unless clearly defined in the present disclosure. The terms as described below are defined in consideration of the functions of the present disclosure, but the meaning of the terms may be changed according to a user, intention of an operator, or convention. Therefore, the definitions of the terms should be made based on the contents throughout the specification.

In the present disclosure, the term "longitudinal direction" refers to a traveling direction of a subject vehicle, and the term "lateral direction" refers to a direction perpendicular to a traveling direction of a subject vehicle. The term "steering avoidance information" refers to information, including a driving direction in which a subject vehicle should travel in order to avoid a collision with another vehicle, a steering avoidance time for which the subject vehicle should travel in order to avoid a collision with another vehicle, a velocity or acceleration at which the subject vehicle should travel in order to avoid a collision with another vehicle, and the like. Also, the term "front straight line of a subject vehicle" refers to a straight line extending in a traveling direction of the subject vehicle with reference to the center of the subject vehicle. Also, the term "overlap" refers to a phenomenon where a subject vehicle and another vehicle overlap each other along a driving path of the subject vehicle and a driving path of another vehicle. Also, the term "allowable lateral acceleration" refers to a lateral acceleration which is allowable in a way that doesn't cross a dynamic limit according to a velocity of a subject vehicle. Further, the term "required longitudinal distance" refers to a longitudinal distance required to complete steering avoidance according to the calculated steering avoidance information.

Hereinafter, a collision avoidance apparatus and a collision avoidance method according to embodiments of the present disclosure will be described with reference to the accompanying drawings.

FIG. 1 is a block diagram illustrating a configuration of a collision avoidance apparatus according to the present disclosure.

Referring to FIG. 1, the collision avoidance apparatus 100 according to the present disclosure includes: a first detector 110 configured to detect another vehicle information including a longitudinal velocity and a lateral velocity of another vehicle, and distance information including a longitudinal distance and a lateral distance from another vehicle; a second detector 120 configured to detect subject vehicle information including a velocity and a yaw rate of the subject vehicle; a calculator 130 configured to determine whether steering avoidance is executable, on the basis of the another vehicle information, the subject vehicle information, and the distance information, and when steering avoidance is executable, calculate steering avoidance information on steering avoidance of the subject vehicle; and a control unit 140 configured to control the subject vehicle to travel according to the steering avoidance information.

The first detector 110 may detect a distance from an object such as another vehicle by using at least one of sensors disposed in the subject vehicle, and may detect a relative velocity and a relative acceleration of the object on the basis of a distance from the detected object and an operating time of the detected object. A distance from the object may include a longitudinal distance and a lateral distance from the object.

According to an embodiment, the first detector 110 may include: an image sensor operable to be disposed at a vehicle so as to have a field of view exterior of the vehicle, and configured to capture image data; and a processor configured to process the image data captured by the image sensor. According to an embodiment, the image sensor and the processor may be implemented as one camera sensor.

The image sensor may be disposed at an autonomous driving vehicle so as to have a field of view exterior of the autonomous driving vehicle. At least one image sensor may be mounted in each part of the vehicle so as to have a field of view in the front or rear of the vehicle or on each side thereof.

Image information picked up by the image sensor may be configured as image data, and thus may signify image data captured by the image sensor. Hereinafter, in the present disclosure, image information picked up by the image sensor may signify image data captured by the image sensor. Image data captured by the image sensor may be generated in one format among, for example, RAW-format AVI, MPEG-4, H.264, DivX, and JPEG. The image data captured by the image sensor may be processed by the processor.

Also, the image sensor may be disposed at a vehicle so as to have a field of view exterior of the vehicle, and may be configured to capture image data. The image data captured by the image sensor may be processed by the processor, and after being processed by the processor, may be used to acquire another vehicle information including a longitudinal velocity and a lateral velocity of another vehicle, and distance information including a longitudinal distance and a lateral distance from another vehicle. The another vehicle information and the distance information, together with subject vehicle information, may be used to: determine whether steering avoidance is executable; when steering avoidance is executable, calculate steering avoidance information on steering avoidance of a subject vehicle; and generate a control signal for the subject vehicle so that the subject vehicle travels according to the steering avoidance information.

The processor may be operable to process the image data captured by the image sensor. As an example, at least a part of an operation of acquiring, from the image data, another vehicle information and information on a distance from another vehicle may be executed by the processor.

The processor may be implemented using at least one of electrical units capable of performing a function of processing image data and other functions, such as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, and microprocessors.

According to an embodiment, the first detector 110 may further include at least one of a radar sensor, a light detection and ranging (LiDAR) sensor, and an ultrasonic sensor.

A radar sensor may emit an electromagnetic wave and may analyze an electromagnetic wave which is reflected and returns from an object, and may measure a distance from the object. A radar sensor or a radar system used in the present disclosure may include at least one radar sensor unit, for example, at least one of a front detection radar sensor mounted on the front side of a vehicle, a rear radar sensor mounted in the rear thereof, and a lateral direction or lateral direction and rear detection radar sensor mounted on each side thereof. The radar sensor or radar system may process data by analyzing a transmitted signal and a received signal, so as to acquire information on an object, and to this end, may include an Electronic Control Unit (ECU) or a processor. Data transmission or signal communication from the radar sensor to an ECU may be performed using a communication link, such as an appropriate vehicle network bus.

The radar sensor includes at least one transmission antenna, which transmits a radar signal, and at least one reception antenna which receives a reflected signal received from an object.

In order to form a virtual antenna aperture larger than an actual antenna aperture, the radar sensor according to the present embodiment may adopt a multi-dimensional antenna array and a Multiple-Input and Multiple-Output (MIMO) signal transmission/reception scheme.

For example, a two-dimensional antenna array is used to achieve horizontal and vertical angle preciseness and resolution. When a two-dimensional antenna array is used, a signal may be transmitted or received by means of two scans which are horizontally and vertically separate (time-multiplexed), and MIMO may be used separately from horizontal and vertical scans (time-multiplexing) of a two-dimensional radar.

More specifically, the radar sensor according to the present embodiment may adopt a configuration of a two-dimensional antenna array including: a transmission (Tx) antenna unit including a total of 12 transmission antennas; and a reception (Rx) antenna unit including a total of 16 reception antennas, and as a result, may have a total of 192 virtual reception antennas arranged therein.

In the present example, the transmission antenna unit may include three transmission antenna groups, each including four transmission antennas, wherein a first transmission antenna group may be vertically spaced from a second transmission antenna group at a predetermined distance, and the first or second transmission antenna group may be horizontally spaced from a third transmission antenna group at a predetermined distance D.

Also, the reception antenna unit may include four reception antenna groups, each including four reception antennas, wherein the reception antenna groups are arranged to be vertically spaced from one another, and may be disposed between the first and third transmission antenna groups which are horizontally spaced from each other.

Also, in another embodiment, an antenna of a radar sensor may have a two-dimensional antenna array disposed therein, and as the example, each antenna patch may have rhombus lattice arrangement so that an unnecessary side lobe can be reduced.

Alternatively, a two-dimensional antenna array may include a V-shaped antenna array in which multiple radiation patches are arranged in the shape of V, and more specifically, may include two V-shaped antenna arrays. In this configuration, a single feed to an apex of each V-shaped antenna array is implemented.

Alternatively, a two-dimensional antenna array may include an X-shaped antenna array in which multiple radiation patches are arranged in the shape of X, and more specifically, may include two X-shaped antenna arrays. In this configuration, a single feed to a center of each X-shaped antenna array is implemented.

Also, the radar sensor according to the present embodiment may use a MIMO antenna system to implement vertical and horizontal detection accuracy or resolution.

More specifically, in a MIMO system, transmission antennas may transmit signals having independent waveforms which are distinguished from each other. That is, each transmission antenna may transmit a signal having an independent waveform which is distinguished from that of a signal transmitted by another transmission antenna, and since the transmitted signals have different waveforms, each reception antenna may determine a transmission antenna that has transmitted a signal from which a signal reflected from an object is resulted.

Further, the radar sensor according to the present embodiment may include: a radar housing configured to accept a substrate including transmission/reception antennas and a circuit; and a radome constituting an appearance of the radar housing. In this configuration, the radome may be made of a material which can reduce the attenuation of transmitted/received radar signals, and may be implemented as a front or rear bumper of a vehicle, a grill thereof, a lateral body thereof, or outer surfaces of elements constituting the vehicle.

That is, the radome of the radar sensor may be disposed inside the grill, bumper, body, or the like of the vehicle, or may be disposed as a part of an element, such as the grill, bumper, and body, constituting an outer surface of the vehicle, so that the convenience of installation of the radar sensor can be provided while an esthetic sense of the vehicle can be improved.

A LiDAR sensor may include a laser transmitter, a receiver, and a processor. The LiDAR sensor may be implemented as a Time of Flight (TOF)-type LiDAR sensor or a phase-shift-type LiDAR sensor.

A TOF-type LiDAR sensor emits a laser pulse signal and receives a reflected pulse signal reflected from an object. The TOF-type LiDAR sensor may measure a distance from the object on the basis of a time for which a laser pulse signal is emittted and then a reflected pulse signal is received. Also, the TOF-type LiDAR sensor may measure a relative velocity in relation to the object on the basis of a change in distance according to a time.

A phase-shift-type LiDAR sensor may emit a laser beam which is continuously modulated at a particular frequency, and may measure a time and a distance from an object on the basis of a phase variation of a signal which is reflected and returns from the object. Also, the phase-shift-type LiDAR sensor may measure a relative velocity in relation to the object on the basis of a change in distance according to a time.

The LiDAR sensor may detect an object on the basis of a transmitted laser beam, and may detect a distance from the detected object and a relative velocity in relation to the detected object. When the object is a stationary object (e.g., a colonnade, a street lamp, a signal lamp, a traffic sign board, etc.), the LiDAR sensor may detect a driving velocity of a vehicle on the basis of a TOF related to the object.

An ultrasonic sensor may transmit a ultrasonic wave having a pulse waveform, and may detect a distance from an object on the basis of a time until the transmitted ultrasonic wave returns. The ultrasonic sensor may include an ultrasonic transmitter, a receiver, and a processor.

The ultrasonic sensor may detect an object on the basis of the transmitted ultrasonic wave, and may detect a distance from the detected object and a relative velocity in relation to the detected object. When the object is a stationary object (e.g., a colonnade, a street lamp, a signal lamp, a traffic sign board, etc.), the ultrasonic sensor may detect a driving velocity of a vehicle on the basis of a TOF related to the object.

However, this configuration is only an example, and thus the present disclosure is not limited thereto. The first detector 110 is not limited to a particular sensor if the first detector 110 can acquire another vehicle information or distance information.

The second detector 120 may detect a velocity of a subject vehicle by using a vehicle velocity sensor including a wheel velocity sensor which is one of vehicle sensors, and may detect an acceleration of the subject vehicle by using a gravity acceleration sensor. However, this configuration is only an example, and thus the second detector 120 is not limited to a particular sensor if the second detector 120 can detect a velocity or an acceleration of a subject vehicle. Further, the second detector 120 may detect another factor which is not a velocity or an acceleration, and may detect a velocity and an acceleration of a subject vehicle on the basis of the detected factor and the mechanism of a velocity or acceleration.

A controller may control an overall operation of the collision avoidance apparatus 100. According to an embodiment, the controller may be implemented by an ECU. The controller may receive, from a processor, a result of processing of image data. The controller may be configured to control steering avoidance of a subject vehicle at least in part based on the processing of image data. According to an embodiment, the controller may include the calculator 130 and the control unit 140.

The calculator 130 may receive detected information from the first detector 110 and the second detector 120. The calculator 130 may determine whether steering avoidance is executable, on the basis of the another vehicle information, subject vehicle information, and distance information. The calculator 130 may check whether a predetermined avoidance-executable condition is satisfied, on the basis of a current driving state and a predictive driving state of a subject vehicle and a current driving state and a predictive driving state of another vehicle. Also, when steering avoidance is not needed according to driving states of the subject vehicle and another vehicle, the calculator 130 may determine that steering avoidance is inexecutable.

When steering avoidance is determined to be executable, the calculator 130 may calculate steering avoidance information required to control steering avoidance of the subject vehicle. The calculator 130 may calculate steering avoidance information, that is, information, including a driving direction in which the subject vehicle should travel in order to avoid a collision with the another vehicle, a steering avoidance time for which the subject vehicle should travel in order to avoid a collision with another vehicle, a velocity or an acceleration at which the subject vehicle should travel in order to avoid a collision with another vehicle, and the like.

The control unit 140 may control an overall operation of the collision avoidance apparatus 100. According to an embodiment, the control unit 140 may be implemented by an ECU. The control unit 140 may receive steering avoidance information calculated by the calculator 130. The control unit 140 may control a steering device, a braking device, and the like, which are disposed in the subject vehicle, so that the subject vehicle travels according to the steering avoidance information.

By this configuration, when steering avoidance is determined to be executable on the basis of the information of the subject vehicle and the information of the another vehicle, steering avoidance information for avoiding a collision with the another vehicle may be calculated, and the subject vehicle may be controlled according to the steering avoidance information, and thus, when steering avoidance is not needed or is inexecutable, execution of steering avoidance can be prevented.

The collision avoidance apparatus 100 according to the present disclosure may include: a first detector configured to include an image sensor operable to be disposed at a vehicle so as to have a field of view exterior of the vehicle, the image sensor configured to capture image data; a second detector configured to detect subject vehicle information including a velocity and a yaw rate of a subject vehicle; and a Domain Control Unit (DCU) configured to acquire another vehicle information including a longitudinal velocity and a lateral velocity of another vehicle, and distance information including a longitudinal distance and a lateral distance from the another vehicle by processing the image data captured by the image sensor, and control at least one a driver assist system disposed in the vehicle.

According to an embodiment, the above-described processor configured to process image data, the above-described controller, and controllers of various devices disposed in a subject vehicle may be integrated into one unit and may be implemented as a DCU. In this configuration, the DCU may generate various vehicle control signals so as to control a DAS disposed in a vehicle, various DAS-related devices of the vehicle, and the like.

The DCU may determine whether steering avoidance is executable, according to another vehicle information, subject vehicle information, and distance information at least in part based on processing of image data, and when steering avoidance is executable, may calculate steering avoidance information on steering avoidance of a subject vehicle, and may control the subject vehicle to travel according to the steering avoidance information. For this processing, the DCU may include at least one processor.

The DCU may be disposed in a vehicle, and may communicate with at least one image sensor and at least one non-image sensor which are mounted in the vehicle. To this end, an appropriate data link or communication link, such as a vehicle network bus, for data transmission and signal communication may be further included.

The DCU may be operable to control at least one of multiple DASs used for a vehicle. The DCU may control a DAS, such as a Blind Spot Detection (BSD) system, an Adaptive Cruise Control (ACC) system, a Lane Departure Warning System (LDWS), a Lane Keeping Assist System (LKAS), or a Lane Chane Assist System (LCAS), on the basis of sensing data detected by multiple non-image sensors and image data captured by the image sensor.

The DCU may receive detected information from the first detector 110 and the second detector 120. The DCU may determine whether steering avoidance is executable, on the basis of the another vehicle information, the subject vehicle information, and the distance information. The DCU may check whether a predetermined avoidance-executable condition is satisfied, on the basis of a current driving state and a predictive driving state of a subject vehicle and a current driving state and a predictive driving state of another vehicle. Also, when steering avoidance is not needed according to driving states of the subject vehicle and another vehicle, the DCU may determine that steering avoidance is inexecutable.

When steering avoidance is determined to be executable, the DCU may calculate steering avoidance information required to control steering avoidance of the subject vehicle. The DCU may calculate steering avoidance information, that is, information, including a driving direction in which the subject vehicle should travel in order to avoid a collision with the another vehicle, a steering avoidance time for which the subject vehicle should travel in order to avoid a collision with another vehicle, a velocity or an acceleration at which the subject vehicle should travel in order to avoid a collision with another vehicle, and the like.

The DCU may control an overall operation of the collision avoidance apparatus 100. According to an embodiment, the DCU may be implemented by an ECU. The DCU may control a steering device, a braking device, and the like, which are disposed in the subject vehicle, so that the subject vehicle travels according to the steering avoidance information.

By this configuration, when it is determined, on the basis of the information of the subject vehicle and the information of the another vehicle, that steering avoidance is executable, steering avoidance information for avoiding a collision with the another vehicle may be calculated, and the subject vehicle may be controlled according to the steering avoidance information, and thus, when steering avoidance is not needed or is inexecutable, execution of steering avoidance can be prevented.

Hereinafter, an operation of the collision avoidance apparatus 100 will be described in more detail with reference to the related accompanying drawings. Hereinafter, a description will be made focusing on the calculator 130 and the control unit 140 included in the controller, but the present disclosure is not limited thereto. The following description made of operations of the calculator 130 and the control unit 140 can be substantially identically performed by the DCU, except the contents which cannot be applied to the DCU.

FIGS. 2 to 10 are views illustrating an operation of a collision avoidance apparatus according to the present disclosure.

The calculator 130 may receive, from the first detector 110, another vehicle information including a longitudinal velocity and a lateral velocity of another vehicle, and distance information including a longitudinal distance and a lateral distance from the another vehicle. Also, the calculator 130 may receive, from the second detector 120, subject vehicle information including a velocity and a yaw rate of a subject vehicle.

The calculator 130 of the collision avoidance apparatus 100 may calculate a Time To Collision (TTC) when a collision with the another vehicle is predicted, on the basis of the another vehicle information, the subject vehicle information, and the distance information. Various known methods can be applied to a method for calculating a TTC by using information of a subject vehicle and information of another vehicle, and the relevant method is not limited to a particular method.

Figure 2:
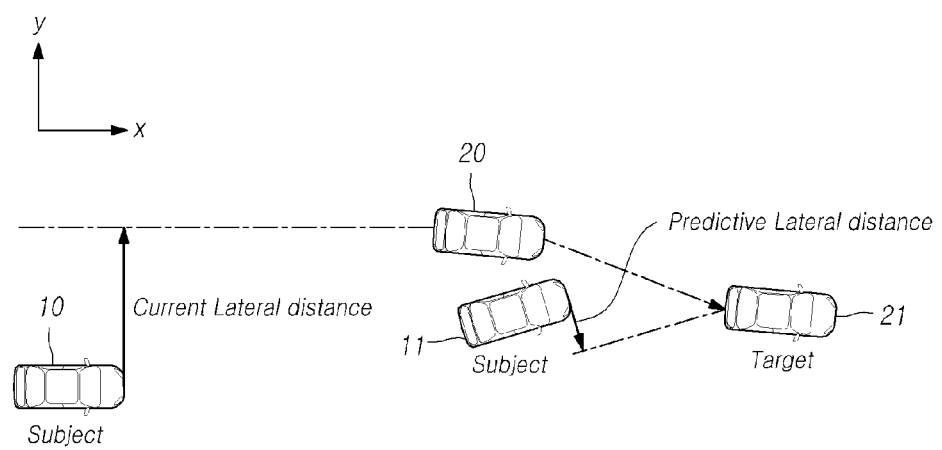
FIGS. 2 to 10 are views illustrating an operation of a collision avoidance apparatus according to the present disclosure.

Referring to FIG. 2, a lateral position of the another vehicle at a current time point and a lateral position of the another vehicle at a TTC are illustrated. As illustrated in FIG. 2, a consideration is given to a case in which the another vehicle 20 is detected at the position of the subject vehicle 10. A distance to a center of the subject vehicle 10 from a straight line extending in parallel with a traveling direction of the subject vehicle 10 from a center of the another vehicle 20 may be calculated as a lateral distance at the current time point (or a current lateral distance).

A consideration is given to a case in which predictive positions in a case where the subject vehicle 10 and the another vehicle 20 travel to the TTC correspond to a subject vehicle 11 and another vehicle 21, respectively. Similarly, a distance to a center of the subject vehicle 11 from a straight line extending in parallel with a traveling direction of the subject vehicle 11 from a center of the another vehicle 21 may be calculated as a lateral distance at the TTC (or a predictive lateral distance).

According to an embodiment, $y_{p\_lat}$ which is the predictive lateral distance may be calculated by Equation (1) below.

$$y_{v\_lat} = \qquad (1)$$
$$-(d_{long} + V_{x,T}\Delta T - \Delta x)\sin(\varphi'\Delta T) + (d_{int} + V_{y,T}\Delta T - \Delta y)\cos(\varphi'\Delta T)$$

$$\begin{cases} y_{y\_Lat}: & d_{long}: \\ \text{Predictive Lateral distance} & \text{Relative longitudinal distance} \\ V_{x,T}: \text{Longitudinal Velocity, Target} & \Delta T: \text{Time variation} \\ \Delta x: \text{Longitudinal deviation, Subject} & \varphi': \text{Yawrate, Subject} \\ d_{lat}: \text{Relative lateral distance} & V_{y,T}: \text{Lateral Velocity, Target} \\ \Delta y: \text{Lateral deviation, Subject} & \end{cases}$$

In Equation (1), $d_{long}$ represents a relative longitudinal distance to the another vehicle, $V_{x,T}$ represents a longitudinal velocity of the another vehicle, $\Delta T$ represents a time variation, $\Delta x$ represents a longitudinal deviation of the subject vehicle, $\Phi'$ represents a yaw rate of the subject vehicle, $d_{lat}$ represents a relative lateral distance to the another vehicle, $V_{y,T}$ represents a lateral velocity of the another vehicle, and $\Delta y$ represents a lateral deviation of the subject vehicle.

Figure 3:
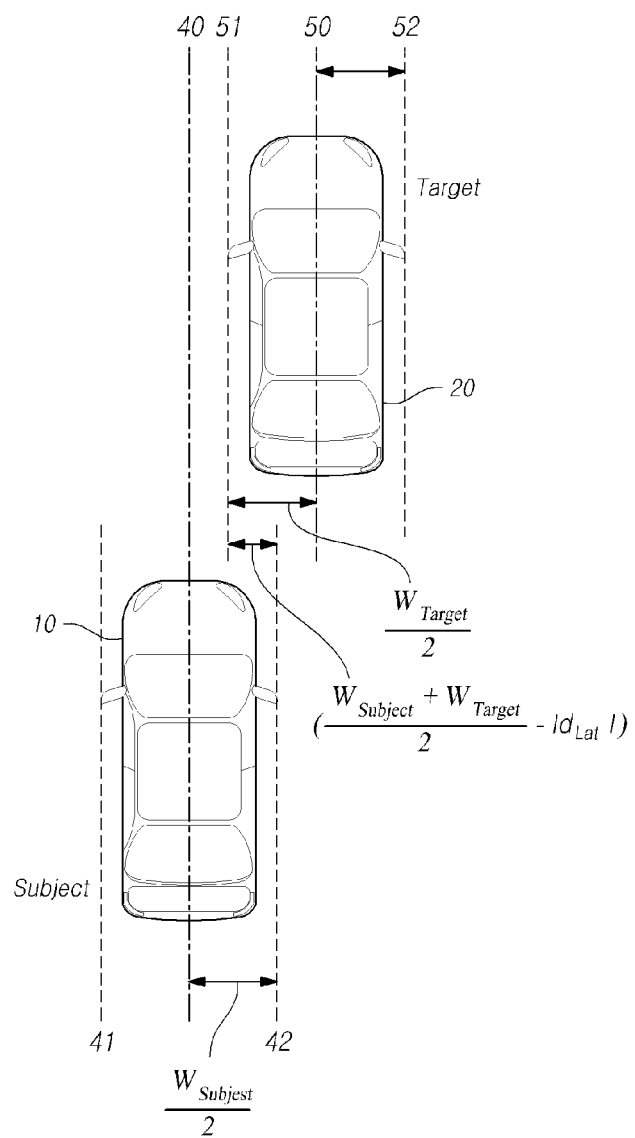

According to an embodiment, the calculator 130 may calculate a predictive overlap of the subject vehicle and a predictive overlap of the another vehicle on the basis of the calculated predictive lateral distance. Referring to FIG. 3, an overlap, in which the subject vehicle 10 and the another vehicle 20 overlap each other, may be calculated by Equation (2) below.

$$\text{Overlap} = \qquad (2)$$
$$\begin{cases} \left(\frac{W_{Subject} + W_{Target}}{2} - |d_{Lat}|\right) \Big/ W_{Subject} & \left(\frac{W_{Subject} + W_{Target}}{2} \geq |d_{Lat}|\right) \\ 0 & \left(\frac{W_{Subject} + W_{Target}}{2} < |d_{Lat}|\right) \end{cases}$$

($W_{Subject}$: Subject Width  $W_{Target}$: Target Width)

That is, with reference to a center line 40 of the subject vehicle 10, one-half of the width $W_{subject}$ of the subject vehicle 10 reaches a left line 41 or a right line 42. Also, with reference to a center line 50 of the another vehicle 20, one-half of the width $W_{target}$ of the another vehicle 20 reaches a left line 51 or a right line 52.

When a distance to the center line 50 of the another vehicle 20 from the center line 40 of the subject vehicle 10 is represented by $d_{lat}$, a value obtained by averaging one-half of the width $W_{subject}$ of the subject vehicle 10 and one-half of the width $W_{target}$ of the another vehicle 20 is less than $d_{lat}$, the another vehicle 20 is located more to the right than the right line 42 of the subject vehicle 10, and thus an overlap does not occur. In contrast, when the value by averaging one-half the width $W_{subject}$ of the subject vehicle 10 and one-half of the width $W_{target}$ of the another vehicle 20 is greater than $d_{lat}$, the another vehicle 20 is located more to the left than the right line 42 of the subject vehicle 10, and thus an overlap occurs.

The calculator 130 may determine whether an overlap occurs, according to a current position and a predictive position of the subject vehicle 10 and a current position and a predictive position of the another vehicle 20.

Figure 4:
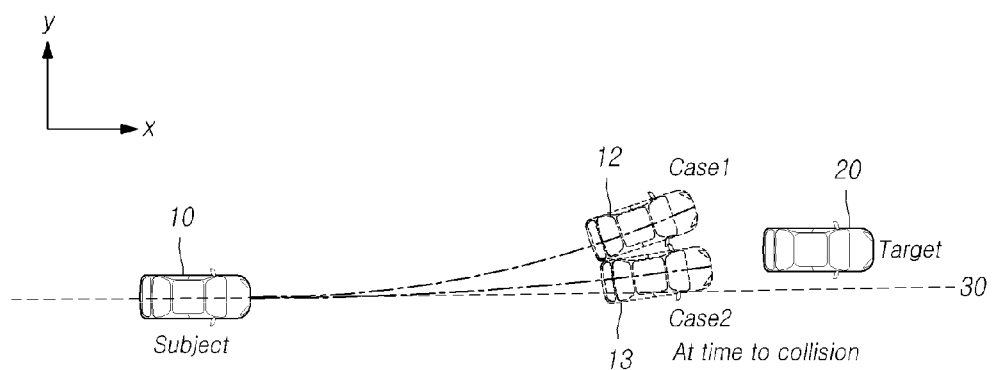
Figure 5:
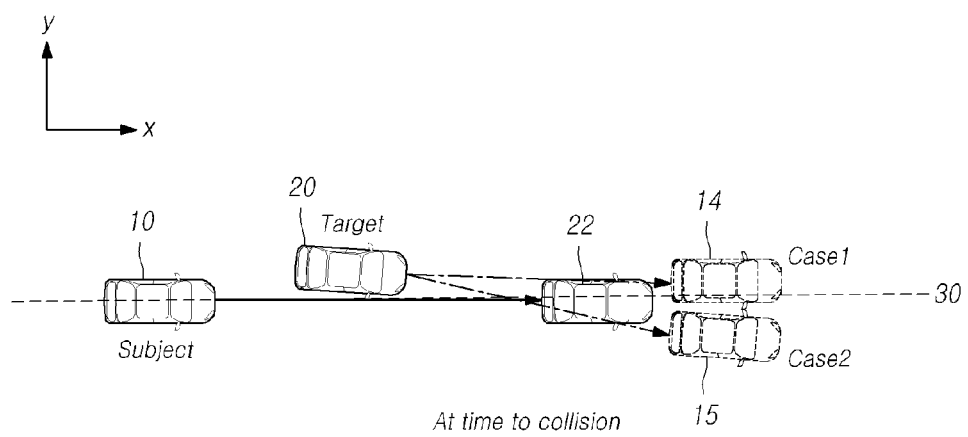

FIGS. 4 and 5 illustrate examples of TTCs according to positions of the subject vehicle 10 and the another vehicle 20 and driving of the subject vehicle 10 and driving the another vehicle 20. FIG. 4 illustrates an example in which, while the another vehicle 20 continuously maintains straight driving, the subject vehicle 10 is steered to the left and approaches the another vehicle 20.

At a current time point, the another vehicle is traveling straight ahead in a range corresponding to the width of the subject vehicle 10 with reference to a front straight line 30 of the subject vehicle 10, and thus a current overlap exists. However, when the subject vehicle 10 is traveling while being steered largely to the left and travels (case 1), at a TTC, the another vehicle 20 gets farther away to the right with reference to the subject vehicle 12. That is, the another vehicle 20 is located in a direction which gets farther away from the left which is a steering direction of a subject vehicle 12. Therefore, it is predicted at the TTC that predictive overlap of the subject vehicle 12 and the another vehicle 20 will not occur.

In the present example, since a predictive overlap does not occur at the TTC, the calculator 130 may determine that when the subject vehicle 10 travels along the relevant driving path, steering avoidance is not needed. Therefore, the calculator 130 may determine that steering avoidance is inexecutable, and thus may not calculate steering avoidance information. That is, even when the current overlap is checked and a determination of whether avoidance braking is needed is started, a predictive overlap at a TTC is not checked, and thus unnecessary avoidance braking may not be performed.

Differently from this configuration, when the subject vehicle 10 is traveling while being steered slightly to the left and travels (case 2), at a TTC, the another vehicle 20 is still located to the left with reference to a subject vehicle 13. That is, the another vehicle 20 is still located in the left which is a steering direction of the subject vehicle 13. Therefore, at a TTC, the occurrence of a predictive overlap of the subject vehicle 13 and the another vehicle 20 is predicted. That is, when a lateral position of the another vehicle and a predictive lateral position of the another vehicle lie in the same direction with reference to a front straight line of the subject vehicle, the calculator 130 may determine that steering avoidance is executable.

In case 2, since a predictive overlap occurs at the TTC, when the subject vehicle 10 travels along the relevant path, the calculator 130 may determine that steering avoidance is needed. Therefore, the calculator 130 may determine that steering avoidance is executable, and thus may calculate steering avoidance information. That is, a current overlap is checked at the current time point and a predictive overlap is also checked at the TTC, and thus avoidance braking may be performed.

In case 2, as in case 1, steering avoidance information, which causes the subject vehicle to be steered further to the left, may be calculated. Therefore, the control unit 140 control a steering device, a braking device, a velocity control device, or the like of the subject vehicle so that the subject vehicle travels according to the steering avoidance information.

In this respect, according to an embodiment, the calculator 130 may further determine whether a secondary collision may occur due to steering avoidance. For example, the calculator 130 may further determine, on the basis of information detected by the first detector 110, whether an obstacle, such as still another vehicle, exists in an adjacent lane in a direction in which the subject vehicle is to travel according to steering avoidance, or whether an adjacent lane does not exist, for example, in the case of the edge of a road, in the direction in which the subject vehicle is to travel according to steering avoidance. As described above, when whether a secondary collision may occur due to steering avoidance is checked, the calculator 130 may determine that steering avoidance is inexecutable, and may transmit, to the control unit 140, a signal notifying of a determination result.

FIG. 5 illustrates a case in which, while the another vehicle 20 is steered to the right and travels, the subject vehicle 10 travels straight ahead and approaches the another vehicle 20.

At a current time point, the another vehicle 20 is located in a left region with reference to a front straight line 30 of the subject vehicle 10. The another vehicle 20 is traveling while being steered to the right, in a range corresponding to the width of the subject vehicle 10 with reference to the front straight line 30 of the subject vehicle 10, and thus a current overlap exists at the current time point. When the another vehicle 20 is traveling while being steered slightly to the right (case 1), at a TTC, another vehicle 21 is still located to the left with reference to a subject vehicle 14.

That is, at the current time point and at the TTC, the another vehicle 20 is located to the left with reference to the subject vehicles 10 and 14. Also, at the TTC, an overlap of the subject vehicle 14 and the another vehicle 21 is predicted to occur. In the present example, since a predictive overlap occurs at the TTC, and thus the calculator 130 may determine that when the subject vehicle 10 travels along the relevant path, steering avoidance is needed. Therefore, the calculator 130 may determine that steering avoidance is executable, and thus may calculate steering avoidance information. That is, a current overlap is checked at the current time point and a predictive overlap is also checked at the TTC, and thus avoidance braking may be performed.

In the present example, the another vehicle is located to the left with reference to the subject vehicle from the current time point to the TTC, and thus steering avoidance information which causes the subject vehicle to be steered to the right may be calculated. Therefore, the control unit 140 may control a steering device, a braking device, a velocity control device, or the like of the subject vehicle so that the subject vehicle travels according to the steering avoidance information. In this configuration, as described above, the calculator 130 may further determine whether a secondary collision may occur due to steering avoidance, and may determine whether steering avoidance is performed.

Figure 6:
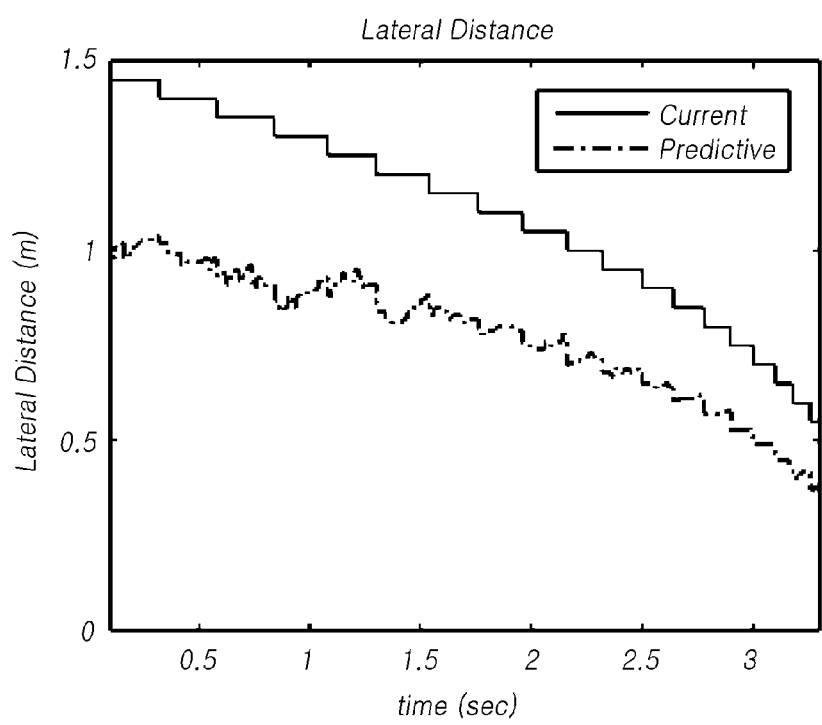
Figure 7:
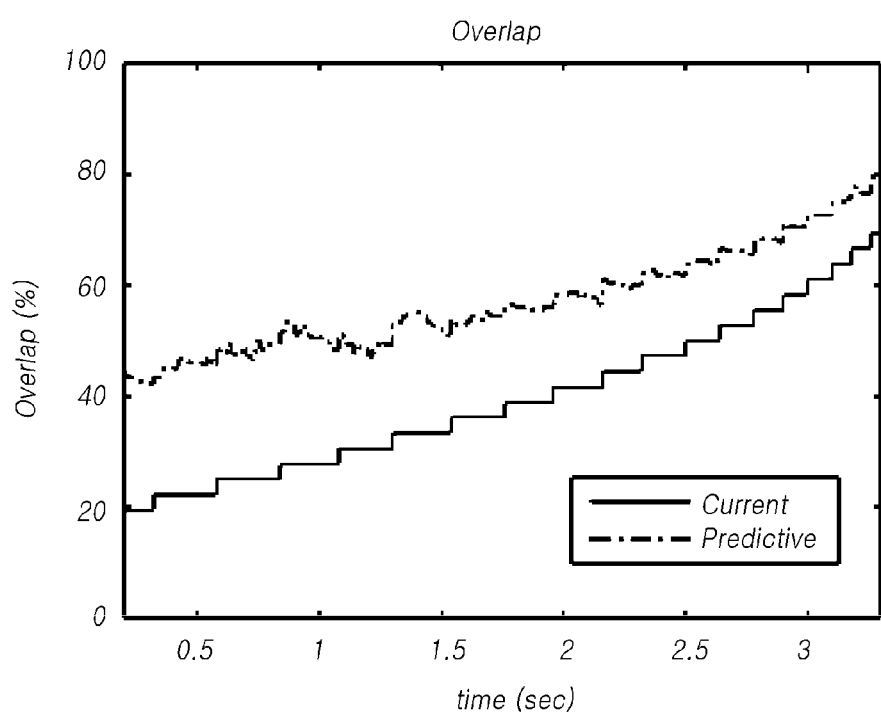

That is, when a current lateral position and a predictive lateral position of the another vehicle lie in the same direction with reference to a front straight line of the subject vehicle, and when a current overlap and a predictive overlap occurs, the calculator 130 may determine that steering avoidance is executable. FIGS. 6 and 7 illustrate examples of a current lateral distance and a predictive lateral distance, and a current overlap and a predictive overlap according to movements of the subject vehicle and the another vehicle in case 1 of FIG. 5. As illustrated in FIGS. 6 and 7, when all lateral distances appear to have positive numbers and a current overlap and a predictive overlap appear to continuously occur, the calculator 130 may determine that steering avoidance is executable.

Differently from this configuration, when the another vehicle 20 is traveling while being steered largely to the right (case 2), at a TTC, the another vehicle 20 is located to the right with reference to the subject vehicle 14. That is, the another vehicle 20, which is located to the left with reference to the subject vehicle 10 at the current time point, is located to the right with reference to the subject vehicle 14 at the TTC.

In the present example, as illustrated in FIG. 5, at the TTC, the occurrence of a predictive overlap of the subject vehicle 14 and another vehicle 22 is predicted. According to an embodiment, when a lateral position of the another vehicle and a predictive lateral position of the another vehicle lie in different directions with reference to a front straight line of the subject vehicle, the calculator 130 may determine that steering avoidance is inexecutable. When the subject vehicle is steered to the right, the amount of movement in a right lateral direction of the another vehicle is large, and thus there is a possibility of collision. When the subject vehicle is steered to the left, a driving path of the subject vehicle may intersect with that of the another vehicle, and thus there is a possibility of collision.

Therefore, the calculator 130 may determine that steering avoidance is inexecutable, and may not calculate steering avoidance information. That is, even when a current overlap and a predictive overlap are checked, if a current lateral position and a predictive lateral position of the another vehicle are not located in the same region with reference to a center of the subject vehicle, in order to prevent the risk of collision, steering avoidance may not be performed. Therefore, safer steering avoidance may be performed.

Figure 8:
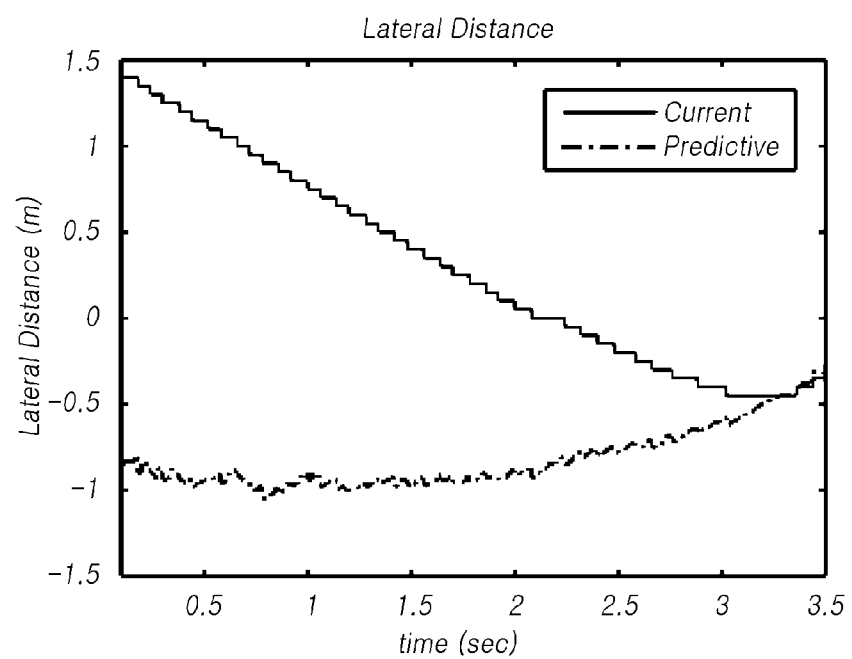
Figure 9:
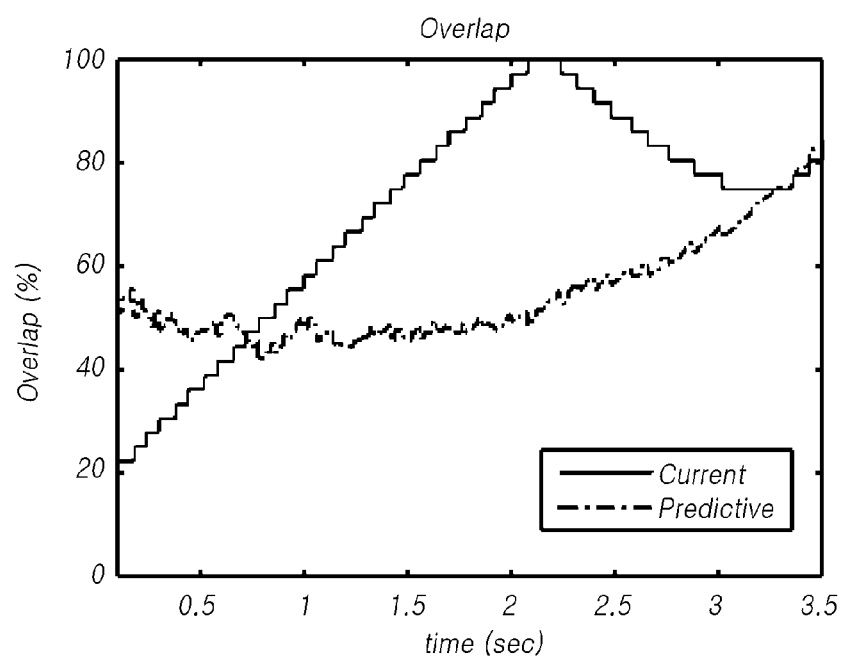

That is, when a current lateral position and a predictive lateral position of the another vehicle lie in different directions with reference to a front straight line of the subject vehicle, or when an overlap does not occur at one of a current time point and a TTC, the calculator 130 may determine that steering avoidance is inexecutable. FIGS. 8 and 9 illustrate examples of a current lateral distance and a predictive lateral distance, and a current overlap and a predictive overlap according to movements of the subject vehicle and the another vehicle in case 2 of FIG. 5. As illustrated in FIGS. 8 and 9, a current overlap and a predictive overlap appear to continuously occur, but a current lateral distance appears to have a positive number and a predictive lateral distance appears to have a negative number, and thus the calculator 130 may determine that steering avoidance is inexecutable.

When steering avoidance is determined to be executable, the calculator 130 may calculate a target lateral movement distance constituting steering avoidance information. According to an embodiment, the calculator 130 may calculate a target lateral movement distance on the basis of a larger overlap value among current overlap information and predictive overlap information. This configuration is prepared for a case in which a lateral distance to the another vehicle just before a collision according to actual driving and a predictive lateral distance are different, and thus safer steering avoidance may be performed.

According to an embodiment, the calculator 130 may calculate, as steering avoidance information, a steering avoidance time required to perform steering avoidance by using the calculated target lateral movement distance. For example, according to the performance of a subject vehicle, an allowable lateral acceleration of the subject vehicle may be different, and a response time for reaching the allowable lateral acceleration may also be different. Therefore, it is necessary to calculate a steering avoidance time required for the same steering avoidance.

Figure 10:
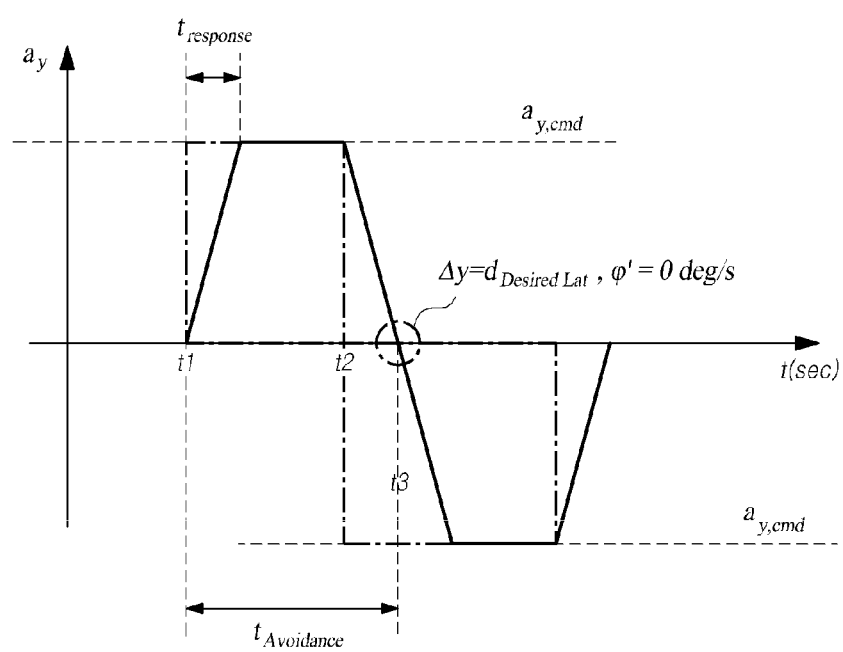

FIG. 10 illustrates a graph of a lateral acceleration during steering avoidance of a subject vehicle. In FIG. 10, a horizontal axis represents time and a vertical axis represents a lateral acceleration. When steering avoidance is started at a time point t1, a response time required to reach an allowable lateral acceleration $a_{y,cmd}$ is $t_{response}$. At a position of Δy, which is a desired lateral deviation, a yaw rate Φ' of the subject vehicle is 0 deg/s, and steering avoidance is terminated. A time to t3, which is a termination time point of steering avoidance, from the time point t1 is steering avoidance time $t_{Avoidance}$.

The calculator 130 may calculate a required longitudinal distance on the basis of subject vehicle information and a steering avoidance time. A required longitudinal distance signifies a distance by which the subject vehicle longitudinally travels for a steering avoidance time in which the subject vehicle laterally travels according to steering avoidance information. A required longitudinal distance may calculated by Equation (3) below.

$$d_{Avoidance} = t_{Avoidance} \cdot v_{rel} + \frac{1}{2} a_{rel} \cdot t_{Avoidance}^2 \qquad (3)$$

$$\begin{pmatrix} d_{Avoidance}: & t_{Avoidance}: \\ \text{Steering Avoidance Distance} & \text{Steering Avoidance Time} \\ v_{rel}: & a_{rel}: \text{Relative} \\ \text{Relative Longitudinal Velocity} & \text{Longitudinal Acceleration} \end{pmatrix}$$

In Equation (3), $d_{Avoidance}$ represents a required longitudinal distance which is a steering avoidance distance, $t_{Avoidance}$ represents a steering avoidance time, $v_{rel}$ represents a relative longitudinal velocity, and $a_{rel}$ represents a relative longitudinal acceleration.

Only when the calculated required longitudinal distance is shorter than a longitudinal distance to another vehicle, the calculator 130 may determine that steering avoidance is executable. That is, when a required longitudinal distance is longer than a longitudinal distance to another vehicle, a subject vehicle travels by the longitudinal distance to the another vehicle before the elapse of a steering avoidance time, and thus a required lateral movement is not performed. Therefore, there is a possibility of collision.

According to an embodiment, when steering avoidance is executable, the control unit 140 may control a subject vehicle to perform steering avoidance at an allowable lateral acceleration in an avoidance direction. That is, as illustrated in FIG. 10, the control unit 140 may control such that the subject vehicle has a lateral acceleration from the time point t1.

Also, the control unit 140 may control such that the subject vehicle travels at an allowable lateral acceleration in a direction opposite to an avoidance direction from a time point which is faster by a response time than a steering avoidance time. That is, as illustrated in FIG. 10, the control unit 140 may control such that the subject vehicle has a lateral acceleration in a direction opposite to the avoidance direction from a time point t2 which is faster by a response time $t_{response}$ than the time point t3. Accordingly, the subject vehicle decreasingly slowly moves in a lateral direction on and after the time point t2 and terminates the lateral movement at a desired lateral position, so that a yaw rate can approach 0. As a result, when the steering avoidance is completed, the attitude of the subject vehicle can be stably restored to the state before the steering avoidance.

By this configuration, when steering avoidance is determined to be executable on the basis of information of a subject vehicle and information of another vehicle, steering avoidance information for avoiding a collision with another vehicle is calculated so as to control the subject vehicle, thereby preventing execution of steering avoidance in a case where steering avoidance is not needed or is inexecutable. Also, steering avoidance is performed by determining whether steering avoidance is executable, on the basis of whether a current overlap occurs and whether a predictive overlap occurs, which are detected on the basis of information of a subject vehicle and information of another vehicle, so that steering avoidance can be more safely performed.

Figure 11:
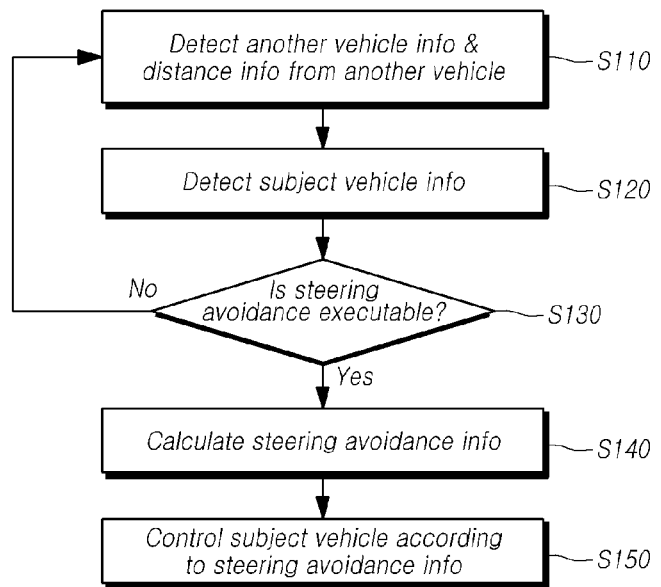
FIG. 11 is a flowchart illustrating a collision avoidance method according to the present disclosure.

FIG. 11 is a flowchart illustrating a collision avoidance method according to the present disclosure.

The collision avoidance method according to the present disclosure may be implemented in the collision avoidance apparatus 100 described with reference to FIG. 1. Hereinafter, the collision avoidance method according to the present disclosure and an operation of the collision avoidance apparatus 100 for implementing the same will be described in detail with reference to the accompanying drawings.

Referring to FIG. 11, in operation S110, the collision avoidance apparatus may detect another vehicle information including a longitudinal velocity and a lateral velocity of another vehicle, and distance information including a longitudinal distance and a lateral distance from the another vehicle.

A first detector of the collision avoidance apparatus may detect a distance from an object such as another vehicle by using at least one of sensors disposed in the subject vehicle, and may detect a relative velocity and a relative acceleration of the object on the basis of a distance from the detected object and an operating time of the detected object. A distance from the object may include a longitudinal distance and a lateral distance from the object.

According to an embodiment, the first detector may include at least one of a camera sensor, a radar sensor, and an ultrasonic sensor. The camera sensor may include: a light collector configured to receive light; an imager configured to capture an image from the received light; an adjustment device configured to adjust a state; and the like. A radar sensor may emit an electromagnetic wave and may analyze an electromagnetic wave which is reflected and returns from an object, and may measure a distance from the object. An ultrasonic sensor may transmit a ultrasonic wave having a pulse waveform, and may detect a distance from an object on the basis of a time until the transmitted ultrasonic wave returns. However, this configuration is only an example, and thus the present disclosure is not limited thereto. The first detector is not limited to a particular sensor if the first detector can acquire another vehicle information or distance information.

Referring again to FIG. 11, in operation S120, the collision avoidance apparatus may detect subject vehicle information including a velocity and a yaw rate of a subject vehicle.

The second detector of the collision avoidance apparatus may detect a velocity of a subject vehicle by using a vehicle velocity sensor including a wheel velocity sensor which is one of vehicle sensors, and may detect an acceleration of the subject vehicle by using a gravity acceleration sensor. However, this configuration is only an example, and thus the second detector is not limited to a particular sensor if the second detector can detect a velocity or an acceleration of a subject vehicle. Further, the second detector may detect another factor which is not a velocity or an acceleration, and may detect a velocity and an acceleration of a subject vehicle on the basis of the detected factor and the mechanism of a velocity or acceleration.

Referring again to FIG. 11, in operation S130, the collision avoidance apparatus may determine whether steering avoidance is executable, on the basis of the another vehicle information, the subject vehicle information, and the distance information.

A calculator of the collision avoidance apparatus may receive detected information from the first detector and the second detector. The calculator may determine whether steering avoidance is executable, on the basis of the another vehicle information, subject vehicle information, and distance information. The calculator may check whether a predetermined avoidance-executable condition is satisfied, on the basis of a current driving state and a predictive driving state of a subject vehicle and a current driving state and a predictive driving state of another vehicle. Also, when steering avoidance is not needed according to driving states of the subject vehicle and another vehicle, the calculator may determine that steering avoidance is inexecutable. When steering avoidance is determined to be inexecutable (No in operation S130), the collision avoidance apparatus may return to operation S110 and may perform operation S110 and operations after operation S110.

Referring again to FIG. 11, when steering avoidance is executable, in operation S140, the collision avoidance apparatus may calculate steering avoidance information on steering avoidance of the subject vehicle When steering avoidance is determined to be executable (Yes in operation S130), the calculator of the collision avoidance apparatus may calculate steering avoidance information required to control steering avoidance of the subject vehicle. The calculator may calculate steering avoidance information, that is, a driving direction in which the subject vehicle should travel in order to avoid a collision with the another vehicle, a steering avoidance time for which the subject vehicle should travel in order to avoid a collision with another vehicle, a velocity or acceleration at which the subject vehicle should travel in order to avoid a collision with another vehicle, and the like.

Referring again to FIG. 11, in operation S150, the collision avoidance apparatus may control the subject vehicle to travel according to the steering avoidance information.

A control unit of the collision avoidance apparatus may receive the steering avoidance information calculated by the calculator. The control unit may control a steering device, a braking device, and the like disposed in the subject vehicle so that the subject vehicle travels according to the steering avoidance information.

By this configuration, when steering avoidance is determined to be executable on the basis of the information of the subject vehicle and the information of the another vehicle, steering avoidance information for avoiding a collision with the another vehicle may be calculated, and the subject vehicle may be controlled according to the steering avoidance information, and thus, when steering avoidance is not needed or is inexecutable, execution of steering avoidance can be prevented.

Hereinafter, a collision avoidance method will be described in more detail with with reference to the accompanying drawings.

Figure 12:
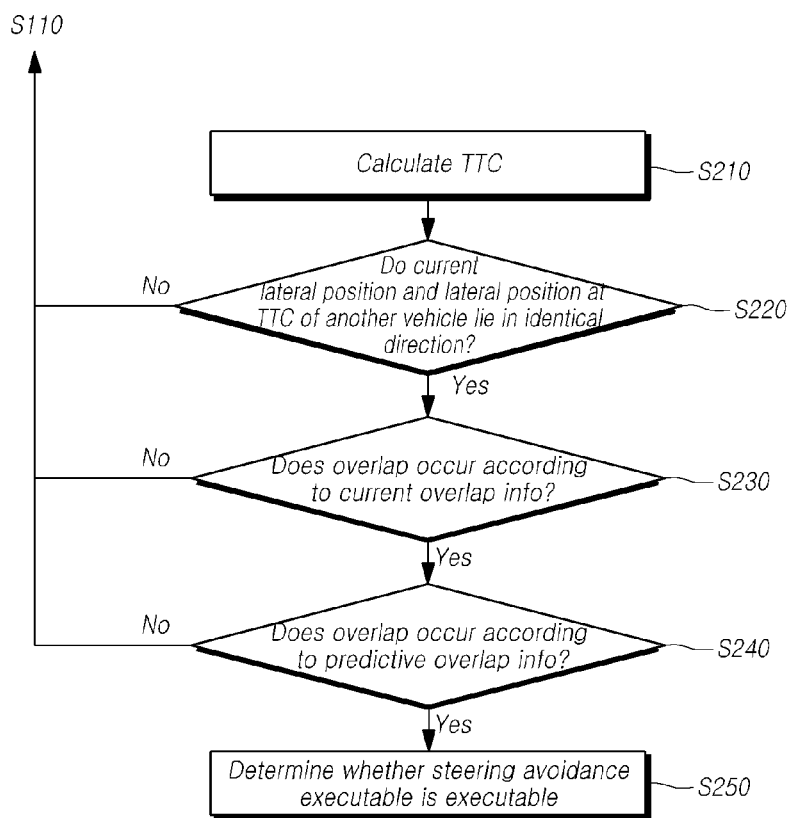
FIG. 12 is a flowchart illustrating a method for determining whether steering avoidance is executable according to the present disclosure.
Figure 13:
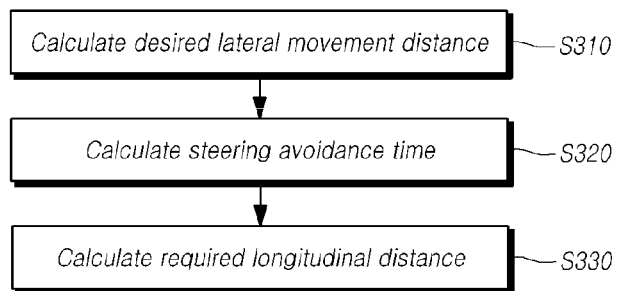
FIG. 13 is a flowchart illustrating a method for calculating steering avoidance information according to the present disclosure.
Figure 14:
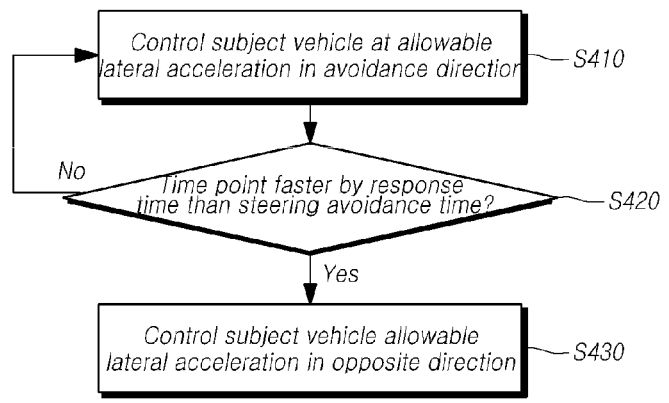
FIG. 14 is a flowchart illustrating a method for controlling a subject vehicle according to the present disclosure.

FIG. 12 is a flowchart illustrating a method for determining whether steering avoidance is executable according to the present disclosure. FIG. 13 is a flowchart illustrating a method for calculating steering avoidance information according to the present disclosure. FIG. 14 is a flowchart illustrating a method for controlling a subject vehicle according to the present disclosure.

FIG. 12 specifically illustrates the determination of whether steering avoidance is executable, which is performed in operation S130 of FIG. 11. In operation S210, the calculator of the collision avoidance apparatus may calculate a TTC on the basis of another vehicle information, subject vehicle information, and distance information. The calculator may receive, from the first detector of the collision avoidance apparatus, another vehicle information including a longitudinal velocity and a lateral velocity of another vehicle, and distance information including a longitudinal distance and a lateral distance from the another vehicle. Also, the calculator may receive, from the second detector of the collision avoidance apparatus, subject vehicle information including a velocity and yaw rate of a subject vehicle.

The calculator of the collision avoidance apparatus may calculate a TTC when a collision with the another vehicle is predicted, on the basis of the another vehicle information, the subject vehicle information, and the distance information. Various known methods can be applied to a method for calculating a TTC by using information of a subject vehicle and information of another vehicle, and the relevant method is not limited to a particular method.

Referring to FIG. 12, in operation S220, the collision avoidance apparatus may determine whether a current lateral position and a predictive lateral position of the another vehicle lie in the same direction with reference to a front straight line of the subject vehicle. When the current lateral position and the predictive lateral position of the another vehicle lie in different directions (No in operation S220), the calculator may determine that steering avoidance is inexecutable, and may return to operation S110 of FIG. 11, and may perform operation S110 and operations after operation S110.

When the current lateral position and the predictive lateral position of the another vehicle lie in the same direction (Yes in operation S220), in operation S230, the calculator may determine whether there occurs a current overlap in which the subject vehicle and the another vehicle overlap each other at the current time point, on the basis of the another vehicle information, the subject vehicle information, and the distance information. When the overlap does not occur according to current overlap information (No in operation S230), the calculator may determine that steering avoidance is inexecutable, and may return to operation S110 of FIG. 11, and may perform operation S110 and operations after operation S110.

When the overlap occurs according to the current overlap information (Yes in operation S230), in operation S240, the calculator may determine whether there occurs a predictive overlap in which the subject vehicle and the another vehicle overlap each other at the TTC, on the basis of the another vehicle information, the subject vehicle information, and the distance information. When the predictive overlap does not occur according to predictive overlap information (No in operation S240), the calculator may determine that steering avoidance is inexecutable, and may return to operation S110 of FIG. 11, and may perform operation S110 and operations after operation S110.

When the predictive overlap occurs according to the predictive overlap information (Yes in operation S240), in operation S250, the calculator may determine that steering avoidance is executable. Then, as described in operation S140 of FIG. 11, the calculator may calculate steering avoidance information.

FIG. 13 specifically illustrates calculation of steering avoidance information, which is performed in operation S140 of FIG. 11. When steering avoidance apparatus is executable, in operation S310, the collision avoidance apparatus may calculate desired lateral movement distance on the basis of a larger overlap value among current overlap information and predictive overlap information.

When steering avoidance is determined to be executable, the calculator of the collision avoidance apparatus may calculate a desired lateral movement distance constituting steering avoidance information. According to an embodiment, the calculator may calculate a desired lateral movement distance on the basis of a larger overlap value among the current overlap information and the predictive overlap information. This configuration is prepared for a case in which a lateral distance to the another vehicle just before a collision according to actual driving is different from a lateral distance to the another vehicle at a TTC, and thus safer steering avoidance may be performed.

Referring again to FIG. 13, in operation S320, the collision avoidance apparatus may calculate a steering avoidance time on the basis of a desired lateral movement distance, an allowable lateral acceleration of the subject vehicle, and a response time for reaching the allowable lateral acceleration.

The calculator of the collision avoidance apparatus may calculate, as steering avoidance information, a steering avoidance time required to perform steering avoidance by using the calculated desired lateral movement distance. For example, according to the performance of a subject vehicle, an allowable lateral acceleration of the subject vehicle may be different, and a response time for reaching the allowable lateral acceleration may also be different. Therefore, it is necessary to calculate a steering avoidance time required for the same steering avoidance.

Referring again to FIG. 13, in operation S330, the collision avoidance apparatus may calculate a required longitudinal distance on the basis of the subject vehicle information and a steering avoidance time.

The calculator of the collision avoidance apparatus may calculate a required longitudinal distance on the basis of the subject vehicle information and the steering avoidance time. A required longitudinal distance signifies a distance by which the subject vehicle longitudinally travels for a steering avoidance time for which the subject vehicle laterally travels according to the steering avoidance information.

Only when the calculated required longitudinal distance is shorter than a longitudinal distance to the another vehicle, the calculator 130 may determine that steering avoidance is executable. That is, when a required longitudinal distance is longer than a longitudinal distance to the another vehicle, the subject vehicle travels by the longitudinal distance to the another vehicle before the elapse of a steering avoidance time, and thus a required lateral movement is not performed. Therefore, there is a possibility of collision.

FIG. 14 specifically illustrates a method for controlling a subject vehicle according to steering avoidance information, which is performed in operation S150 of FIG. 11. When steering avoidance is executable, in operation S410, the control unit of the collision avoidance apparatus may control a subject vehicle to be steered at an allowable lateral acceleration in an avoidance direction.

Referring again to FIG. 14, in operation S420, the control unit of the collision avoidance apparatus may determine whether a time point, which is faster by a response time than a steering avoidance time, has arrived after steering avoidance is started. When the time point, which is faster by a response time than a steering avoidance time, has not arrived (No in operation S420), the control unit of the collision avoidance apparatus may continuously perform operation S410.

Referring again to FIG. 14, when the time point, which is faster by a response time than a steering avoidance time, has arrived (Yes in operation S420), in operation S430, the control unit of the collision avoidance apparatus may control such that a subject vehicle travels at an allowable lateral acceleration in a direction opposite to an avoidance direction. That is, the control unit may control such that the subject vehicle has a lateral acceleration in a direction opposite to an avoidance direction from a time point which is faster by a response time than a steering avoidance time. Accordingly, the subject vehicle decreasingly slowly moves in a lateral direction on and after the time point, which is faster by a response time than a steering avoidance time, and terminates the lateral movement at a desired lateral position, so that a yaw rate can approach 0. As a result, when the steering avoidance is completed, the attitude of the subject vehicle can be stably restored to the state before the steering avoidance.

By this configuration, when steering avoidance is determined to be executable on the basis of information of a subject vehicle and information of another vehicle, steering avoidance information for avoiding a collision with another vehicle is calculated so as to control the subject vehicle, thereby preventing execution of steering avoidance in a case where steering avoidance is not needed or is inexecutable. Also, steering avoidance is performed by determining whether steering avoidance is executable, on the basis of whether a current overlap occurs and whether a predictive overlap occurs, which are calculated on the basis of information of a subject vehicle and information of another vehicle, so that steering avoidance can be more safely performed.

The present disclosure as described above may be implemented as computer-readable codes in a medium on which a program is recorded. The computer-readable mediums include all types of recording devices which may be read by a computer system and on which data are stored. Examples of the computer-readable medium include a Hard Disk Drive (HDD), a Solid State Disk (SSD), Silicon Disk Drive (SDD), a Read Only Memory (ROM), a Random Access Memory (RAM), CD-ROM, a magnetic tape, a floppy disk, and an optical data storage device, and may also include things implemented in the form of carrier wave (e.g. transmission through the Internet).

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. A collision avoidance apparatus comprising:
    a first detector configured to comprise a processor configured to process image data captured by an image sensor and the image sensor operable to be disposed at a subject vehicle so as to have a field of view exterior of the subject vehicle, wherein the first detector is configured to detect another vehicle information comprising a longitudinal velocity and a lateral velocity of another vehicle; and distance information comprising a longitudinal distance and a lateral distance from the another vehicle;
    a second detector configured to detect subject vehicle information comprising a velocity and a yaw rate of the subject vehicle; and
    a controller, responsive at least in part to processing by the processor of the image data, configured to control steering avoidance of the subject vehicle,
    wherein the controller is configured to:
        calculate a Time To Collision (TTC) on the basis of the another vehicle information, the subject vehicle information, and the distance information,
        determine whether steering avoidance is executable, based on a determination whether, when a current lateral position of the another vehicle at a current time point is located at one of opposing sides with respect to a front straight line of the subject vehicle at the current time point, a predictive lateral position of the another vehicle at the TTC is still at the same one of the opposing sides with respect to the front straight line of the subject vehicle at the TTC,
        after determining that the steering avoidance is executable based on the determination that, when the current lateral position of the another vehicle at the current time point is located at the one of the opposing sides with respect to the front straight line of the subject vehicle at the current time point, the predictive lateral position of the another vehicle at the TTC is still at the same one of the opposing sides with respect to the front straight line of the subject vehicle at the TTC, calculate steering avoidance information on steering avoidance of the subject vehicle; and
        control the subject vehicle to travel according to the steering avoidance information,
    wherein the front straight line of the subject vehicle refers to a straight line extending in a traveling direction of the subject vehicle with reference to a center of the subject vehicle.

2. The collision avoidance apparatus of claim 1, wherein the first detector is configured to further comprise at least one of a radar sensor, a light detection and ranging (LiDAR) sensor, and an ultrasonic sensor.

3. The collision avoidance apparatus of claim 1, wherein the controller is configured to calculate:
    current overlap information on whether a driving path of the subject vehicle and a driving path of the another vehicle overlap each other at the current time point, and
    predictive overlap information on whether the driving path of the driving path of the subject vehicle and the driving path of the another vehicle overlap at the TTC, on the basis of the another vehicle information, the subject vehicle information, and the distance information, and
    when the steering avoidance is executable, calculate a desired lateral movement distance on the basis of one among the current overlap information and the predictive overlap information which has a larger overlap possibility.

4. The collision avoidance apparatus of claim 3, wherein the controller is configured to calculate a steering avoidance time on the basis of the desired lateral movement distance, an allowable lateral acceleration of the subject vehicle, and a response time of the subject vehicle for reaching the allowable lateral acceleration.

5. The collision avoidance apparatus of claim 4, wherein the controller is configured to:
    calculate a required longitudinal distance on the basis of the subject vehicle information and the steering avoidance time; and
    determine that the steering avoidance is executable when the required longitudinal distance is shorter than the longitudinal distance.

6. The collision avoidance apparatus of claim 4, wherein the controller is configured to:
    when the steering avoidance is executable, control the subject vehicle to perform steering avoidance at the allowable lateral acceleration in an avoidance direction; and
    then control the subject vehicle to travel at the allowable lateral acceleration in a direction opposite to the avoidance direction from a time point earlier by the response time than the steering avoidance time.

7. A collision avoidance apparatus comprising:
    a first detector configured to comprise an image sensor operable to be disposed at a subject vehicle so as to have a field of view exterior of the subject vehicle, the image sensor configured to capture image data;
    a second detector configured to detect subject vehicle information comprising a velocity and a yaw rate of the subject vehicle; and
    a domain control unit, configured to process the image data captured by the image sensor, acquire another vehicle information comprising longitudinal velocity and a lateral velocity of another vehicle, and distance information comprising a longitudinal distance and a lateral distance from the another vehicle, and control at least one driver assistance system disposed in the subject vehicle,
    wherein the domain control unit, responsive at least in part to processing by the processor of the image data, is configured to:
        calculate a Time To Collision (TTC) on the basis of the another vehicle information, the subject vehicle information, and the distance information;
        determine whether steering avoidance is executable, according to a determination whether, when a current lateral position of the another vehicle at a current time point is located at one of opposing sides with respect to a front straight line of the subject vehicle at the current time point, a predictive lateral position of the another vehicle at the TTC is still at the same one of the opposing sides with respect to the front straight line of the subject vehicle at the TTC;
        after determining that the steering avoidance is executable based on the determination that, when the current lateral position of the another vehicle at the current time point is located at the one of the opposing sides with respect to the front straight line of the subject vehicle at the current time point, the predictive lateral position of the another vehicle at the TTC is still at the same one of the opposing sides with respect to the front straight line of the subject vehicle at the TTC, calculate steering avoidance information on steering avoidance of the subject vehicle; and
        control the subject vehicle to travel according to the steering avoidance information,
    wherein the front straight line of the subject vehicle refers to a straight line extending in a traveling direction of the subject vehicle with reference to a center of the subject vehicle.

8. The collision avoidance apparatus of claim 7, wherein the domain control unit is configured to:
    determine that steering avoidance is executable when a lateral position of the another vehicle and a lateral position of the another vehicle at the TTC lie in a front straight line of the subject vehicle.

9. The collision avoidance apparatus of claim 7, wherein the domain control unit is configured to calculate:
    current overlap information on whether a driving path of the subject vehicle and the driving path of the another vehicle overlap each other at the current time point, and
    predictive overlap information on whether the driving path of the subject vehicle and the driving path of the another vehicle overlap at the TTC, on the basis of the another vehicle information, the subject information, and the distance information, and
    when the steering avoidance is executable, calculate a desired lateral movement distance on the basis of one among the current overlap information and the predictive overlap information which has a larger overlap possibility.

10. The collision avoidance apparatus of claim 9, wherein the domain control unit is configured to calculate a steering avoidance time on the basis of the desired lateral movement distance, an allowable lateral acceleration of the subject vehicle, and a response time of the subject vehicle for reaching the allowable lateral acceleration.

11. The collision avoidance apparatus of claim 10, wherein the domain control unit is configured to:
    calculate a required longitudinal distance on the basis of the subject vehicle information and the steering avoidance time; and
    determine that the steering avoidance is executable when the required longitudinal distance is shorter than the longitudinal distance.

12. The collision avoidance apparatus of claim 10, wherein the domain control unit is configured to:
    when the steering avoidance is executable, control the subject vehicle to perform steering avoidance at the allowable lateral acceleration in an avoidance direction; and
    then control the subject vehicle to travel at the allowable lateral acceleration in a direction opposite to the avoidance direction from a time point earlier by the response time than the steering avoidance time.

13. A collision avoidance method comprising:
    detecting another vehicle information comprising a longitudinal velocity and a lateral velocity of another vehicle, and distance information comprising a longitudinal distance and a lateral distance from the another vehicle;
    detecting subject vehicle information comprising a velocity and a yaw rate of a subject vehicle;
    calculating a Time To Collision (TTC) on the basis of the another vehicle information, the subject vehicle information, and the distance information;
    determining whether steering avoidance is executable based on a determination whether, when a current lateral position of the another vehicle at a current time point is located at one of opposing sides with respect to a front straight line of the subject vehicle at the current time point, a predictive lateral position of the another vehicle at the TTC is still at the same one of the opposing sides with respect to the front straight line of the subject vehicle at the TTC;

after determining that the steering avoidance is executable based on the determination that, when the current lateral position of the another vehicle at the current time point is located at the one of the opposing sides with respect to the front straight line of the subject vehicle at the current time point, the predictive lateral position of the another vehicle at the TTC is still at the same one of the opposing sides with respect to the front straight line of the subject vehicle at the TTC, calculating steering avoidance information on steering avoidance of the subject vehicle; and controlling the subject vehicle according to the steering avoidance information, wherein the front straight line of the subject vehicle refers to a straight line extending in a traveling direction of the subject vehicle with reference to a center of the subject vehicle.

* * * * *